United States Patent [19]

Sigrimis et al.

[11] Patent Number: 4,510,495
[45] Date of Patent: Apr. 9, 1985

[54] REMOTE PASSIVE IDENTIFICATION SYSTEM

[75] Inventors: Nick A. Sigrimis, Athens, Greece; Norman R. Scott, Ithaca, N.Y.

[73] Assignee: Cornell Research Foundation, Inc., Ithaca, N.Y.

[21] Appl. No.: 406,471

[22] Filed: Aug. 9, 1982

[51] Int. Cl.[3] .......................... H04Q 9/00; G01S 9/56
[52] U.S. Cl. .......................... 340/825.54; 340/825.72; 343/6.5 SS; 119/51 R
[58] Field of Search .................. 340/825.54, 825.31, 340/825.72; 343/6.8 R, 6.5 SS; 119/51 R

[56]                References Cited
U.S. PATENT DOCUMENTS

| | | | |
|---|---|---|---|
| 3,516,575 | 6/1970 | Moffitt . | |
| 3,541,995 | 11/1970 | Fathauer | 119/51 R |
| 3,897,753 | 8/1975 | Lee | 119/51 R |
| 3,929,277 | 12/1975 | Byrne et al. | 119/51 R |
| 3,944,928 | 3/1976 | Augenblick et al. | 343/6.8 R |
| 3,964,024 | 6/1976 | Hutton et al. | 343/6.8 LC |
| 4,036,178 | 7/1977 | Lee et al. | 119/51 R |
| 4,040,053 | 8/1977 | Olsson | 343/6.5 SS |
| 4,049,950 | 9/1977 | Byrne et al. | 119/51 R |
| 4,065,753 | 12/1977 | Paul, Jr. | 119/1 |
| 4,075,632 | 2/1978 | Baldwin et al. | 343/6.8 R |
| 4,087,791 | 5/1978 | Lemberger | 343/6.5 SS |
| 4,129,855 | 12/1978 | Rodrian | 119/51 R |
| 4,196,418 | 4/1980 | Kip et al. | 340/825.31 |
| 4,242,663 | 12/1980 | Slobodin | 343/6.5 SS |
| 4,262,632 | 4/1981 | Hanton et al. | 119/51 R |
| 4,274,083 | 6/1981 | Tomoeda | 340/572 |
| 4,388,524 | 6/1983 | Walton | 340/825.72 |

OTHER PUBLICATIONS

Koelle et al., "Short-Range Passive Telemetry by Modulated Back-Scatter of Incident CW RF Carrier Beam," Third International Symposium of Biotelemetry (undated).

Holm, Dale M., "Development of a National Electronic Identification System for Livestock", American Society of Animal Science Meeting, Jul. 30, 1979.

Holm, Dale E. et al., "Electronic Identification and Temperature Monitoring—1978", Livestock Conservation Institute Meeting, May 18, 1978.

Bobbett, R. E. et al., "Description of a Passive Temperature Telemetry System," Los Alamos Scientific Laboratory Informal Report, Feb., 1977.

Street, M. J., "A Pulse-Code Modulation System for Automatic Animal Identification", Journal of Agricultural Engineering Res., 1979, pp. 249-258.

Primary Examiner—Donald J. Yusko
Attorney, Agent, or Firm—Sughrue, Mion, Zinn, Macpeak, and Seas

[57]                ABSTRACT

A system for passively identifying remote objects such as livestock is disclosed. A power transmitter transmits a plurality of radio frequency burst signals at a given frequency, and a uniquely coded transponder associated with the object to be identified produces a plurality of coded identification signals in response to the burst signals from the transmitter. The coded identification signals are read by a receiver to identify the object. The transmitter and receiver are time division multiplexed for alternate operation. Accordingly, when an object is to be identified, the transmitter is switched on to transmit the burst signals, thereby activating the transponder to produce the coded identification signals. The transmitter is then switched off and the receiver switched on to receive the identification signals for identifying the object.

15 Claims, 23 Drawing Figures

REMOTE PASSIVE IDENTIFICATION SYSTEM

BACKGROUND OF THE INVENTION

The present invention relates to a passive system for identifying remote objects using pulsed radar principles wherein a coded transponder associated with the object is energized by radio frequency interrogator burst pulses to produce coded identification signals which are used to identify the object. The system has particular utility for identifying livestock and the like.

Many techniques to detect or identify objects have been developed in the past with applications to industry, inventory control, security, safety control, etc. Individual object identification has become more complex because a specific identification code is desired as opposed to simply the presence or absence of a detection signal. Optimally, a specific identification code must be sent back from the source to the interrogation device.

The present invention was developed to satisfy the need to uniquely identify many animals in the livestock industry. Animal identification is the first step towards an automatic herd management system, which will make it possible to know individual cow production, feeding level, animal health and to keep a daily record.

A transmission link must be established from the animal to transfer the coded identification signal. While a number of different types of transmission links are possible including optical, audio, and laser beams, and electromagnetic waves, radio transmission waves have been selected as being the most cost effective. The identification system of the present invention utilizes passive transponders which are associated with the livestock to be identified. The transponders are passive, as opposed to active, in that no integral power source is provided. Passive transponder techniques are most attractive due to their long life and low cost characteristics. Transponder design utilizing circuit integration techniques of hybrid technology can greatly reduce initial costs.

BRIEF DESCRIPTION OF THE PRIOR ART

Identification systems using passive transponders associated with remote objects to be identified are well-known in the patented prior art as evidenced by the patents to Hanton et al. U.S. Pat. No. 4,262,632, Lee U.S. Pat. No. 3,897,753, Hutton et al. U.S. Pat. No. 3,964,024, and Rodrian U.S. Pat. No. 4,129,855. The transponders of Lee, Hutton et al., and Rodrian are powered inductively at low frequencies (30–300 KHz) or very low frequencies (3–30 KHz), while the transponder disclosed in the Hanton et al. patent uses radio frequency energy to interrogate and power the transponder. Furthermore, the transponder of Hanton et al. includes a coded memory unit, whereby a series of binary coded electric pulses peculiar to the object are broadcast back to the interrogator.

While the prior devices normally operate quite satisfactorily, they possess certain inherent drawbacks which decrease their efficiency and increase their cost. Thus for example, the transponders of the prior devices are relatively large and thus are not suitable for implantation in an animal. Furthermore, those transponders which are implantable operate at such high frequencies as to be injurious to an animal's health. Finally, many of the prior art devices include complicated transponder circuitry which increases the costs thereof.

SUMMARY OF THE INVENTION

Accordingly, it is a primary object of the present invention to provide a system for passively identifying remote objects including a transmitter for transmitting a plurality of radio frequency burst signals at a given frequency and a uniquely coded passive transponder associated with the object to be identified. The transponder produces a plurality of coded identification signals at the given frequency in response to the burst signals. The system further includes a receiver for receiving the coded identification signals from the transponder to identify the object and time division multiplexing means for alternately operating the transmitter and receiver. Thus, when the object is to be identified, the transmitter is switched on by the time division multiplexing means to transmit the burst signals, thereby activating the transponder to produce the coded identification signals, whereupon the time division multiplexing means is operable to switch off the transmitter and to switch on the receiver to receive the coded identification signals for identifying the object.

According to another object of the invention, the transponder includes an inductor-capacitor antenna circuit which receives and stores power from the burst pulses to generate the identification signals in response thereto.

It is a further object of the invention to provide a code register in the transponder for storing the identification code corresponding to the object to be identified.

According to yet another object of the invention, the transmitter includes a radio frequency duty control logic device for time division multiplexing the operation of the transmitter and receiver.

BRIEF DESCRIPTION OF THE FIGURES

Other objects and advantages of the present invention will become apparent from a study of the following specification when viewed in the light of the accompanying drawing, in which.

DETAILED DESCRIPTION

Figure 1:
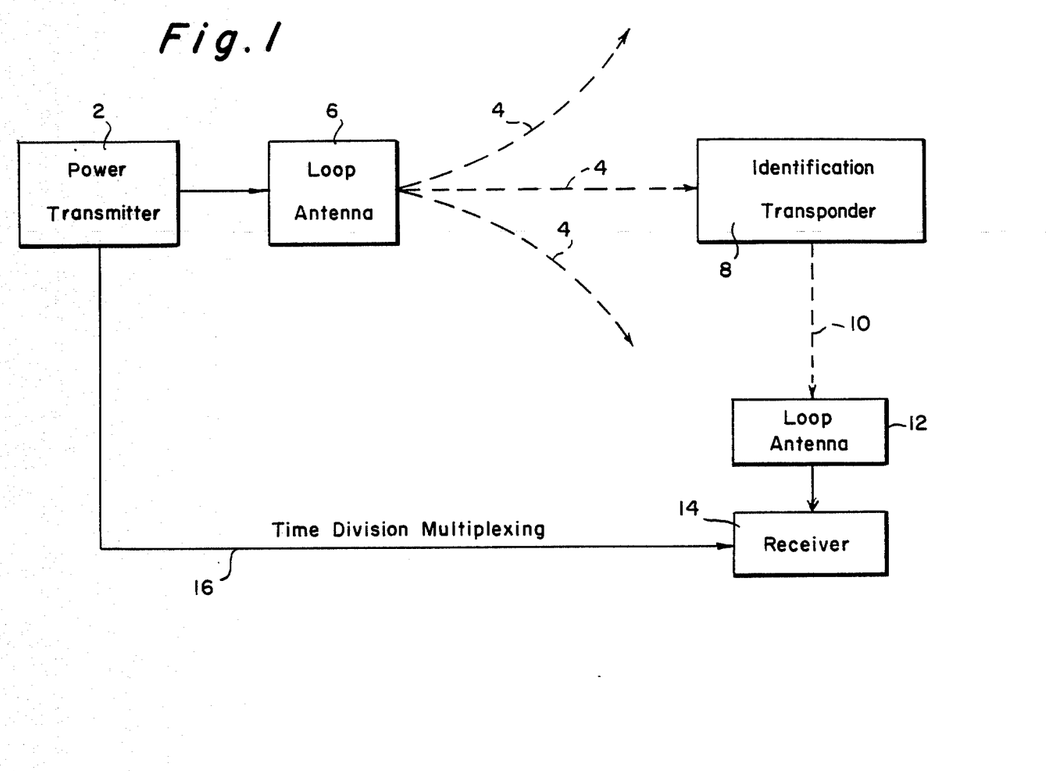
FIG. 1 is a block diagram of the remote passive identification system.

The remote passive identification system of the present invention is shown in FIG. 1. A power transmitter 2 produces a plurality of radio frequency (RF) burst signals 4 which are transmitted via a loop antenna 6 in an oscillating field configuration as will be developed in greater detail below. The burst signals are received by a uniquely coded identification transponder 8 associated with the object to be identified. While the system is suitable for identifying many types of objects such as motor vehicles, railroad cars and the like the system will be described for use in identifying the individual cows of a herd of livestock. Accordingly, the transponder is adapted for mounting on the collar of a cow or preferably is implanted in the cow's body. Different transponders, each uniquely coded, are associated with different cows of a herd for individual animal identification.

The burst signals 4 from the transmitter activate the transponder 8 to produce a plurality of coded identification signals 10. The transmitter burst signals from the transponder, in the form of a ringing echo, are shown more particularly in FIGS. 5a and 5b, respectively. The coded identification signals are received by the loop antenna 12 of a receiver 14 in the identification system. The receiver is operable to interpret the coded identification signals to identify the cow associated with the transponder from which the signals were transmitted.

The operation of the transmitter and receiver is time division multiplexed as shown by the arrow 16. When a cow is to be identified, the transmitter is switched on to produce the burst signals at a given frequency. As will be developed below, the burst signals are of relatively high power since they provide the power for energizing and operating the transponder to produce the coded identification signals which are relatively low power. Owing to the time division multiplexing, the transmitter is switched off and the receiver is switched on to receive low power coded identification signals from the transponder. In this manner, the receiver is prevented from receiving the high power burst signals which would interfere with the low power identification signals and would damage the receiver. The coded identification signals are preferably at the same frequency as the burst signals, thereby minimizing the size and complexity of the transponder circuitry. Time division multiplexing of the transmitter and receiver provides superior characteristics compared to continuous wave operation with respect to signal detection.

The transmitter and receiver circuitry are preferably arranged in an interrogator device having separate loop antennas for transmission and reception. The cows to be identified are brought in succession into the range of the device, which is on the order of six feet, whereby the transmitter transmits the burst signals and the receiver receives the coded identification signals to successively identify the cows.

Figures 3, 5A, 5B, 6A, 6B:
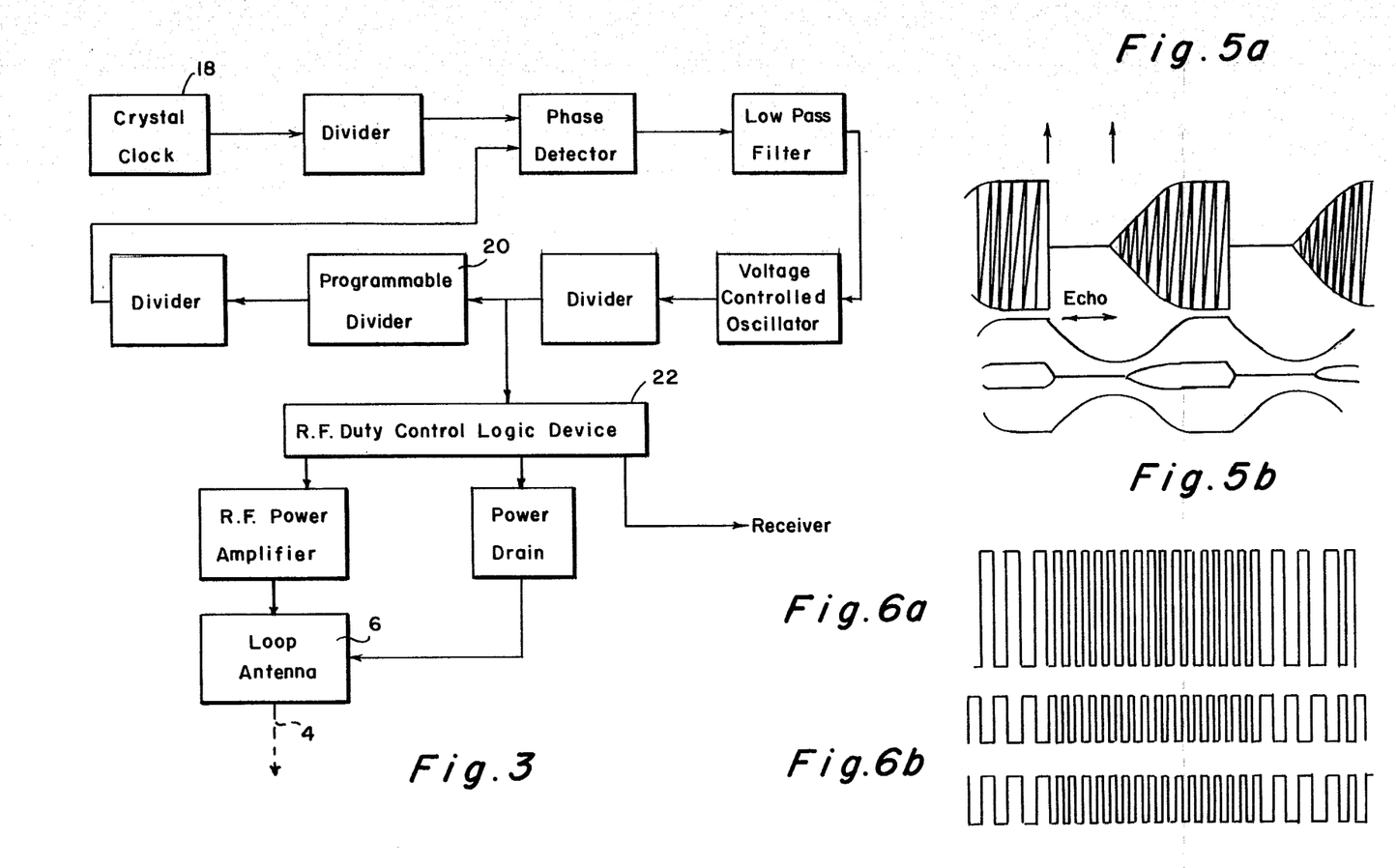
FIG. 3 is a block diagram of the system transmitter.
FIGS. 5a and 5b illustrate the transmitter burst signals and transponder coded identification signals, respectively.
FIGS. 6a and 6b illustrate an encoded data sequence and a radio frequency pulse amplitude modulated wave with a marker, respectively.
Figure 7A:
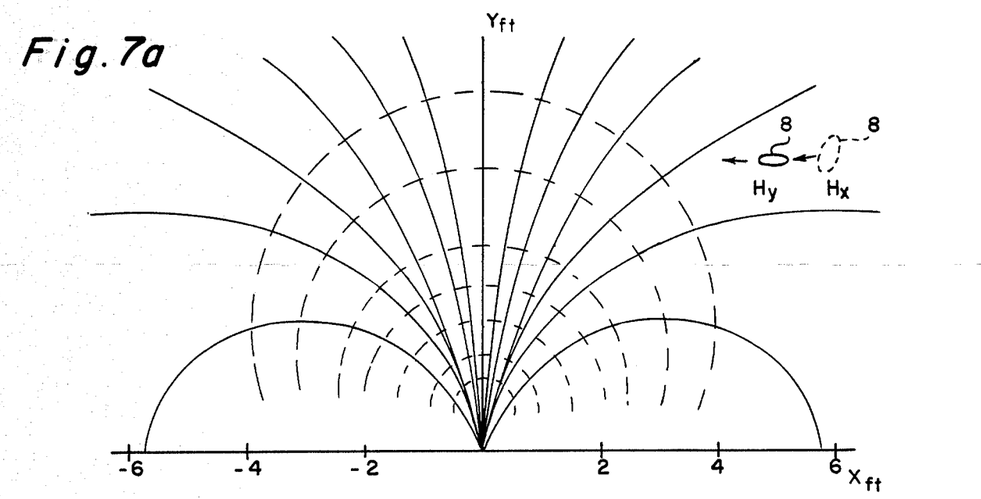
FIGS. 7a, 7b, and 7c illustrate the oscillating field produced by the transmitter, and the horizontal and vertical components of the field, respectively.
Figure 7B:
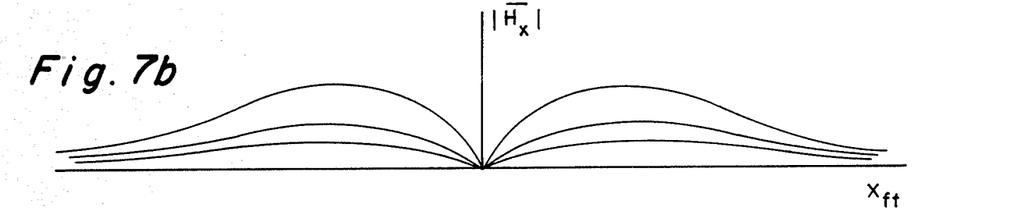
Figure 7C:
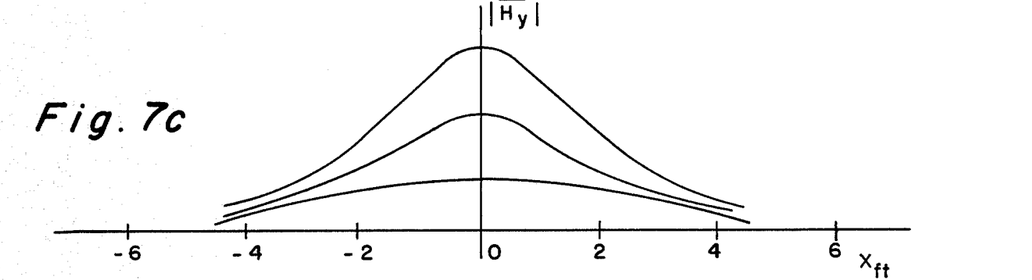

Referring now to FIG. 3, the power transmitter will be described. A crystal clock 18 stabilizes the radio frequency signal which is programmed by the programmable divider 20. The radio frequency duty control logic device 22 provides the time division multiplexing operation of the transmitter and receiver. An RF power amplifier 25 amplifies the RF burst signals prior to transmission by the loop antenna 6 which preferably comprises a power coil. The power coil produces an intermittent oscillating field as shown in FIG. 7a. The horizontal component Hx as a function of the distance X from the transmitter to the transponder is shown in FIG. 7b and the vertical component $H_y$ as a function of X is shown in FIG. 7c. The field pattern of FIG. 7a, typical of a magnetic dipole, is appropriate for capturing the moving transponder 8 under random angle of approach and random movement. For a transponder entering the field at a random angle and maintaining the same orientation along a path, there exists at least one and usually two locations of maximum power reception. For a randomly reoriented path the number of locations of sufficient power pick up may be increased but the expected accumulated active length remains the same. For a transponder to escape unpowered, the combination of approach angle-translational movement-rotational movement must follow a pattern correlated to the field pattern. This is a very unlikely event and it is expected that negligible escape rates will be practiced. The latter also depends on the available field power along the transponder path.

The Poynting vector (P) of the field radiating from the power coil of the transmitter loop antenna is given by $$\vec{P} = \frac{n_o (bR)^4 I_o^2}{32 \, r^3} \sin^2\theta \hat{r} \tag{1}$$

where:
R = radius of the coil loop
r = distance from coil to point P
$I_o$ = current in the loop
$\theta$ = azimuthal angle of point P
b = wave number = $w_o/c = 2\pi f_o/c$
c = speed of light
$n_o$ = characteristic impedance of the free space.

At the given operating frequency $f_o = 2.643$ MHZ:

$$\lambda = \frac{c}{f_o} = 113.5 \text{ m}$$

The radiation resistance of the transmitter antenna power coil, derived from Eq. 1, is found to be 3 mohns and the total radiated power is given by Eq. 1a:

$$W_{rad} = \tfrac{1}{2} R_{rad} I_o^2 \tag{1a}$$

For $I_o = 15A \rightarrow W_{rad} = 340$ mWatts.

The radiated power is very small and the transmitter amplifier works at almost zero efficiency. Radio interference by this system is limited to the near field.

Figure 2:
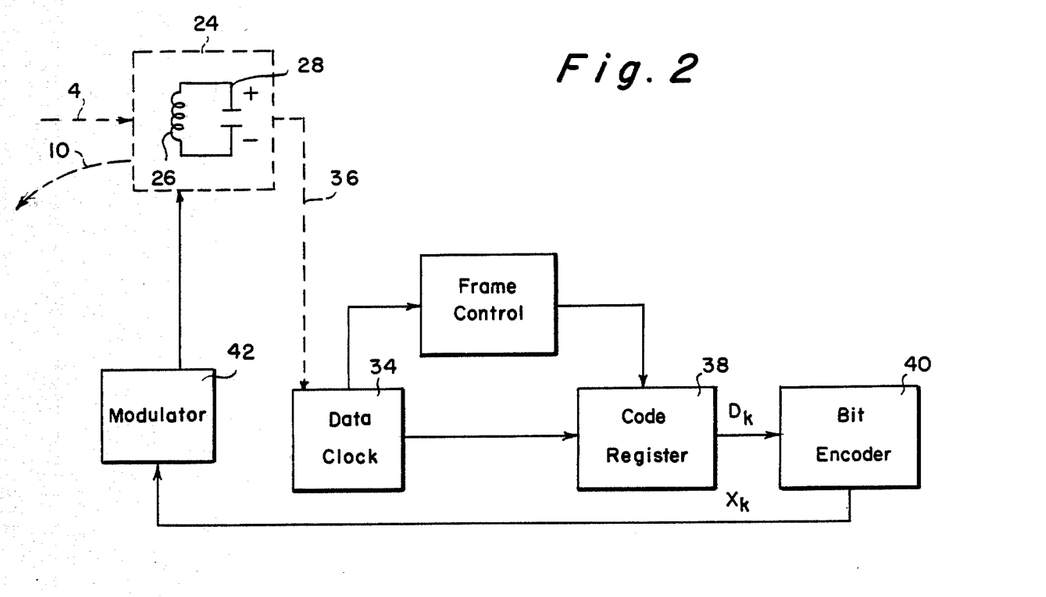
FIG. 2 is a block diagram of the system transponder.

As set forth above, the burst signals from the transmitter loop antenna provide power for the transponder. As shown in FIG. 2, the transponder includes an antenna 24 which comprises an inductor 26 and a storage capacitor 28.

For ranges of the transmitter antenna $r << \lambda$, the radiated field (Eq.1) is dominated by the static field strength and the power coil of the transmitter antenna and the inductor coil of the transponder antenna are considered as magnetically coupled. The magnetic field strength (H) is given by Eq. 2:

$$\vec{H} = \frac{N \cdot A \cdot I_o}{4\pi\, r^3} (2\cos\theta \hat{r} + \sin\theta \hat{\theta}) e^{j w_o t} \qquad (2)$$

where
A = $\pi R^2$
N = number of turns of the coil.

Equation 2 applied to the power coil determines the available power at the transponder site during the "power phase". Applied to the transponder coil, Eq. 2 indicates the signal power reaching the receiving antenna during the "read phase". The field pattern expressed by Eq. 2 is shown in FIG. 7a. The angle $<\theta>$ is a guide for positioning the power and receiving coils with respect to the most likely path of the transponder. The receiving coil must be positioned and oriented for minimum reception from the transmitter power coil and maximum reception from the transponder.

The distance r is an independent, random variable, not under the control of the system designer. Thus, signal strength is expressed by the magnetic dipole moment M of the transponder as follows:

$$M = N \cdot A \cdot I_o = k_1 \cdot N \cdot R^2 \cdot I_o \qquad (3)$$

The signal power induced in the coil of a loop antenna loosely coupled to the transponder is given by Eq. 4:

$$P_s = k_2 \omega_o M = k_2 N R^2 I_o \omega_o = k_3 \frac{R \cdot E_o}{N} \qquad (4)$$

where $E_o$ = the peak "echo" voltage at the transponder LC tank during the read phase, and where the factor for distance has been omitted. Equation 4 implies that the objective of reducing the transponder size (R) reduces the signal power received. Reducing the number of turns N of the transponder coil increases the signal power but on the other side an equivalent increase in field power is required to bring the voltage $E_o$ of the transponder antenna comprising the inductor and capacitor to the same level.

Figures 4, 9:
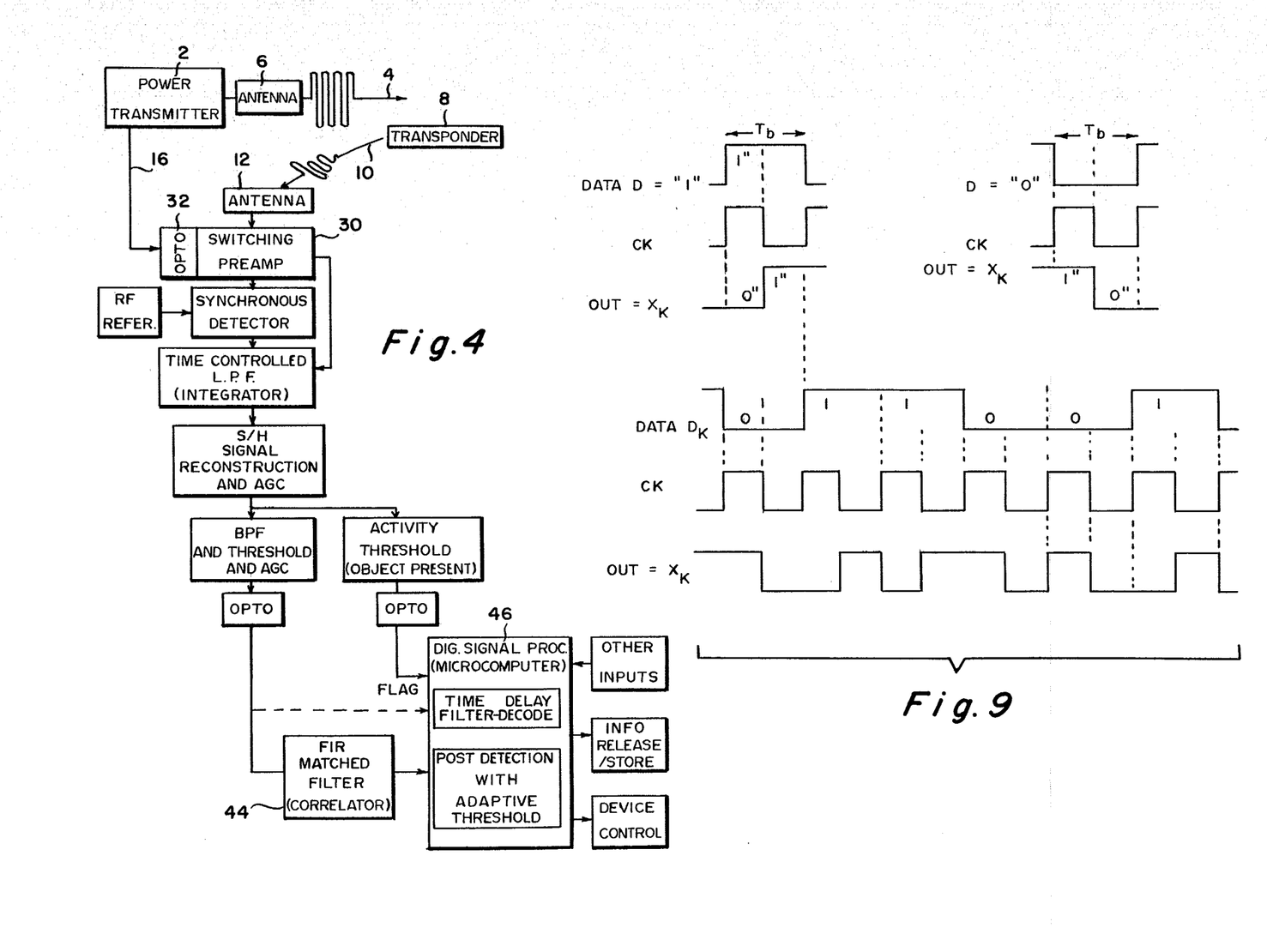
FIG. 4 is a block diagram of the system receiver.
FIG. 9 illustrates the twin binary data signal produced by the transducer.

The receiver of the passive remote identification system of the present invention is shown more particularly in FIG. 4. The receiver comprises a switching preamplifier 30 which receives the incoming coded identification signals from the transponder 8 via the antenna 12. The switching preamplifier further includes an opto-isolator 32 which receives the time division multiplexed signal 16 from the RF duty control logic device of the transmitter 2.

As set forth above, the receiver preamplifier must be switched off during transmission of the radio frequency burst signals from the transmitter to avoid damage to the receiver by the burst signals. However, a fast recovery of the receiver is required when it is switched on to receive the coded identification signals. During the switching on transition period, a switching transient is induced in the front end tuned element of the preamp. The switching circuitry is very important in reducing this transient but the transient response cannot be totally eliminated. This is considered as an additive interference which has the same exact frequency, $\omega_O$, as the received signal but random phase angle, $\theta_t$. The received signal, $S_t$, is the sum of the transponder signal, $X_t$, and the transient interference signal $n_t$, and is described by Eq. 5:

$$S_t = X_t + n_t = X_k \cos \omega_o t + n_o \cos(\omega_o t + \theta_t) \qquad (5)$$

where $X_k$ = binary pulse sequence of the transmitted code.

Figures 8A, 8B, 8C:
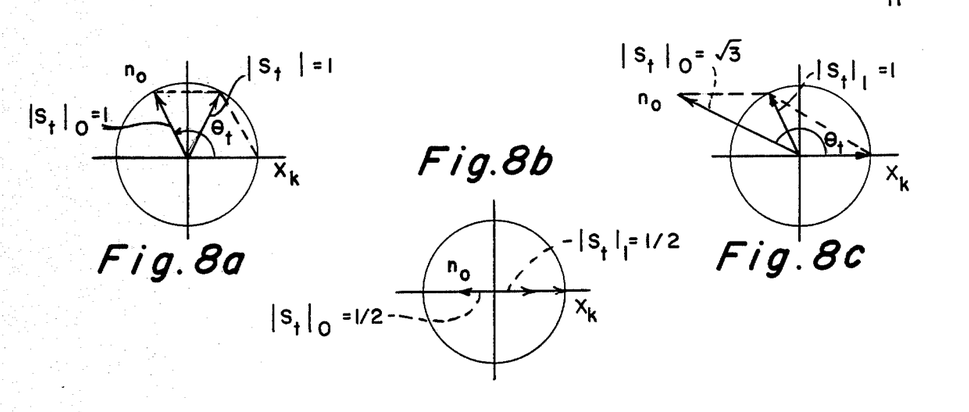
FIGS. 8a, 8b, and 8c illustrate various switching transient effects on the envelope of the coded identification signal received by the receiver.

Eq. 5 implies that the signal power $X_t$ exists entirely in the composite signal in amplitude and phase of $S_t$, the proportions depending on $n_o$ and $\theta_t$. Detection of the signal $X_t$ from the envelope $S_t$ could partly or entirely be missed as shown in FIGS. 8a and 8b. Under certain conditions of $n_o$ and $\theta_t$, the envelope of $S_t$ may produce a pulse sequence which is the complement of $X_k$ sent by the transponder as shown in FIG. 8c. In the case of $\theta_t = 0°$, the envelope of $S_t$ reproduces the sequence $X_k$ without any loss.

The system transponder is shown more particularly in FIG. 2. The transponder includes an LC antenna 24 which receives burst signals from the transmitter and sends coded identification signals to the receiver, both at the same frequency. As set forth above, the burst signals induce a voltage across the inductor coil 26 which is stored in the capacitor 28. When the capacitor is charged, it activates a data clock 34 via a line path 36. A code register 38 is programmed with the data format of the particular transponder in which it is arranged. From the code register, the data format is encoded in a bit encoder 40 to produce the coded identification signal. A modulator 42 modulates the coded signal prior to transmission from the transponder antenna. It will be appreciated that the transponder is only activated in response to the burst signals from the system transmitter, thereby insuring that extraneous coded signals from transponders not to be identified are prevented.

The time division multiplexing scheme between power transmission and signal reception introduces very poor channel performance at low frequencies. Considerable low frequency (DC level drift) is picked up by the channel plus switched receiver. Another source of low frequency noise is the AM modulation of the signal by the change in position and orientation of the transponder.

The first step to optimize channel performance is to carefully shape the baseband signal spectrum. Shaping of signal is performed by the bit encoder 40. The result is a twin binary data signal shown in FIG. 9. As shown therein, a long string of 0's or 1's which would carry low frequencies is eliminated. Rather, each data bit, i.e. a 0 or a 1, is represented by a positive and a negative pulse, the difference being only in the phase. One transistion is guaranteed in the middle of each data bit. A signal from the data clock of the transponder is then sent along with the data and bit synchronization becomes easier. To solve the problem of phase ambiguity as to which transition is the start and which is the middle of a bit, "housekeeping bits" are inserted in the frame format to provide correct phase lock of the receiver clock. Furthermore, with the twin binary data signal of FIG. 9, there is zero DC level transmitted because the modulated binary pulse train probability density is independent of the code word ($P+_1=0.5$, $P-_1=0.5$). This simplifies threshold computation for minimum detection error. Finally, the 3dB bandwidth of the discretely fabricated transponders is 50 KHz under load conditions and the LC antenna has a Q of 53 which can be improved by integrated circuit fabrications.

Figure 10:
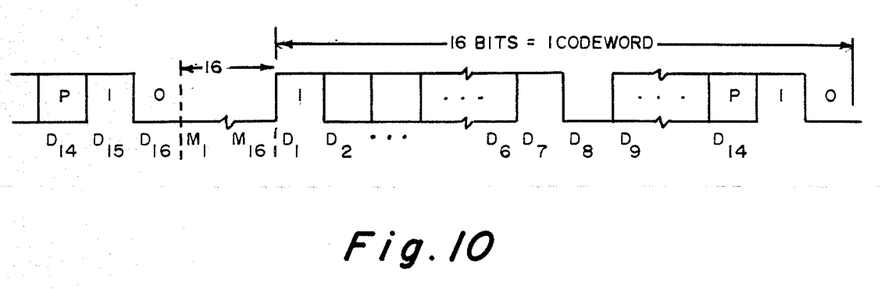
FIG. 10 illustrates the data format within the transponder.

A sample data format, programmable on the code register of the transponder, is shown in FIG. 10 wherein $D_2 - D_6, D_9 - D_{14}$ = information bits $D_1, D_{15}, D_{16}$ = housekeeping bits (start, stop, alarm)

$D_7, D_8$ = insert control bits $M_1 - M_{16}$ = synchronization word (16 × "0"), marker Insert bits, $D_7$-$D_8$, provide quick synchronization (marker detection) without ambiguity. The marker of length 16 is not stored in the register but is simply a 16 bits pause (16 "0"). The codeword that follows is constructed so that the marker cannot appear in any position internally within the word or as an overlap with a portion of the next codeword's marks. The information bits are 10 and all numbers from 0 to 1023 are possible. There is no limit on extending the codeword's length to accommodate larger numbers.

The encoded data sequence is shown in FIG. 6a while the pulse amplitude modulated wave as modulated by the baseband sequence is shown in FIG. 6b.

Figure 11:
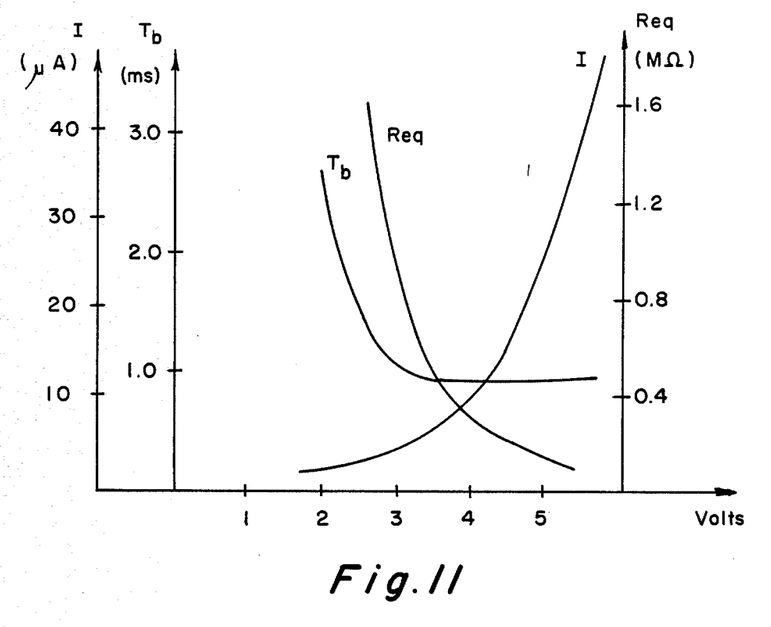
FIG. 11 is a graphical representation of the current consumption and bit period of the transponder versus power supply voltage.
Figure 12:
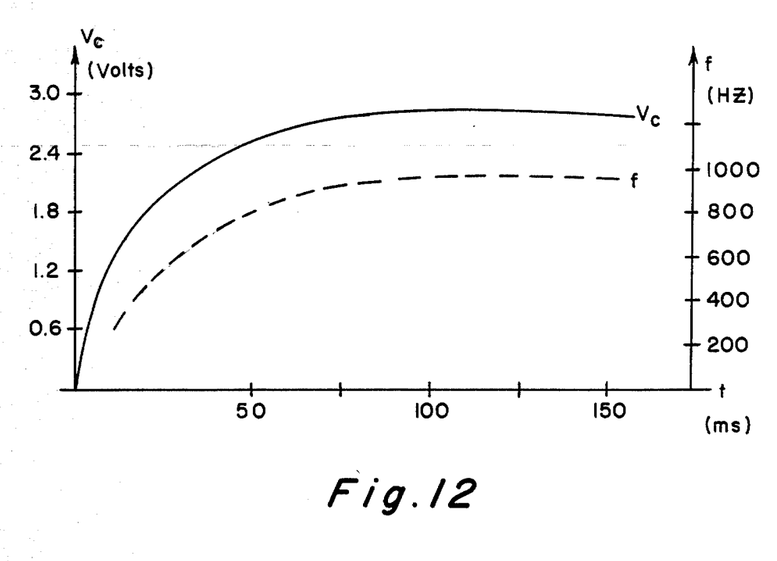
FIG. 12 is a graphical representation of the transponder transient response.

A graphical representation of the current consumption I and bit period $T_b$ of the transponder versus power supply voltage is shown in FIG. 11. The bit period changes only by 10% for voltages above 2.8 volts and the receiver is designed to accept sequences with bit periods, as shown in FIG. 11, using selected values of $T_b$, i.e., 50% longer than the expected minimum value. Transponder transient response is shown in FIG. 12. The charge up time constant is 12 ms and the 90% rise time is 0.13 sec. The minimum registration time (power up +2 frames) is 0.20 sec. For 5 codeword repetitions the required time is 0.3 sec.

Figure 12A:
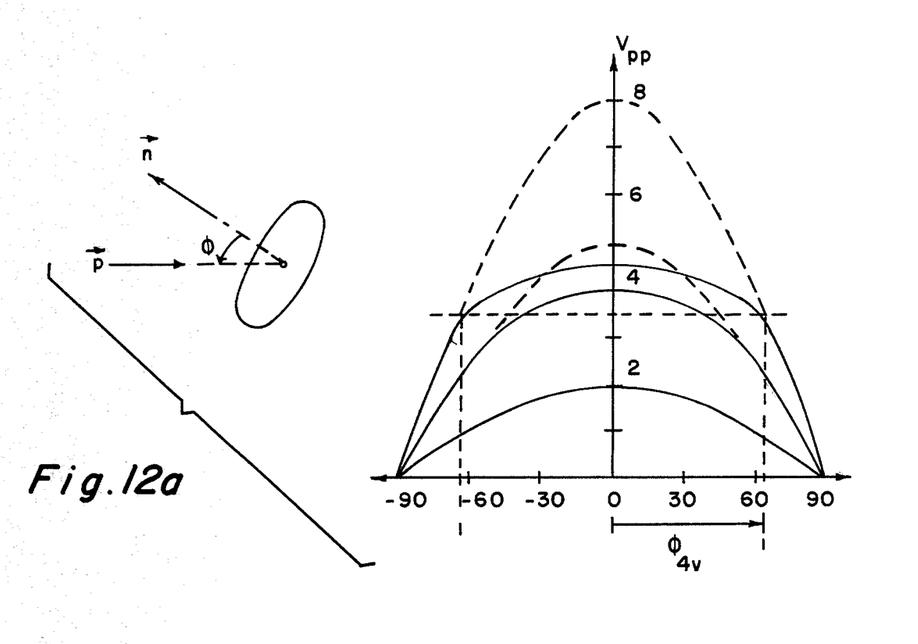
FIG. 12a is a graphical representation of transponder voltage with respect to its orientation to the power field.

The transponder antenna effective area can be expressed as follows: (see FIG. 12a)

$$A_{eff} = A_o(\vec{n}\cdot\vec{p}) \quad (6)$$

The peak to peak voltage across the LC antenna then is expected to be:

$$V_{pp} = k\cdot\cos(\vec{n}\cdot\vec{p}) = k\cos\phi \quad (7)$$

Equation 7 is valid under a no load condition. The load applied from the transponder circuitry modifies Eq. 7 for less $\phi$ dependence. The required voltage level for reliable transmission is 4 Vpp and the transponder capture probability at a point can be defined as:

$$p_c = \frac{\phi 4v}{90} \quad (8)$$

This probability can then be increased by increasing the power of the field. The maximum field power must be determined by the allowable area of transponder activation to prevent multi-transponder response.

Referring once again to FIG. 4, the receiver circuitry is adapted to provide better signal recovery and stability in time. Correlating the composite signal $S_t$ (Eq. 5) with the transponder signal $X_t$ can recover the useful signal $X_t$ while rejecting interference.

The correlator matched filter 44 provides means for stochastic processing of the received signal based on the signal and noise statistics. Likelihood ratio ($\Lambda$) computation for a probability of error criterion decision rule will be part of the signal processor 46. The likelihood ratio is continuously updated based on the current signal simplified statistics. This will allow for signal detection with much smaller signal to noise ratios which reduces the nulling angle of the transponder while maintaining nearly zero error rate.

Figure 13:
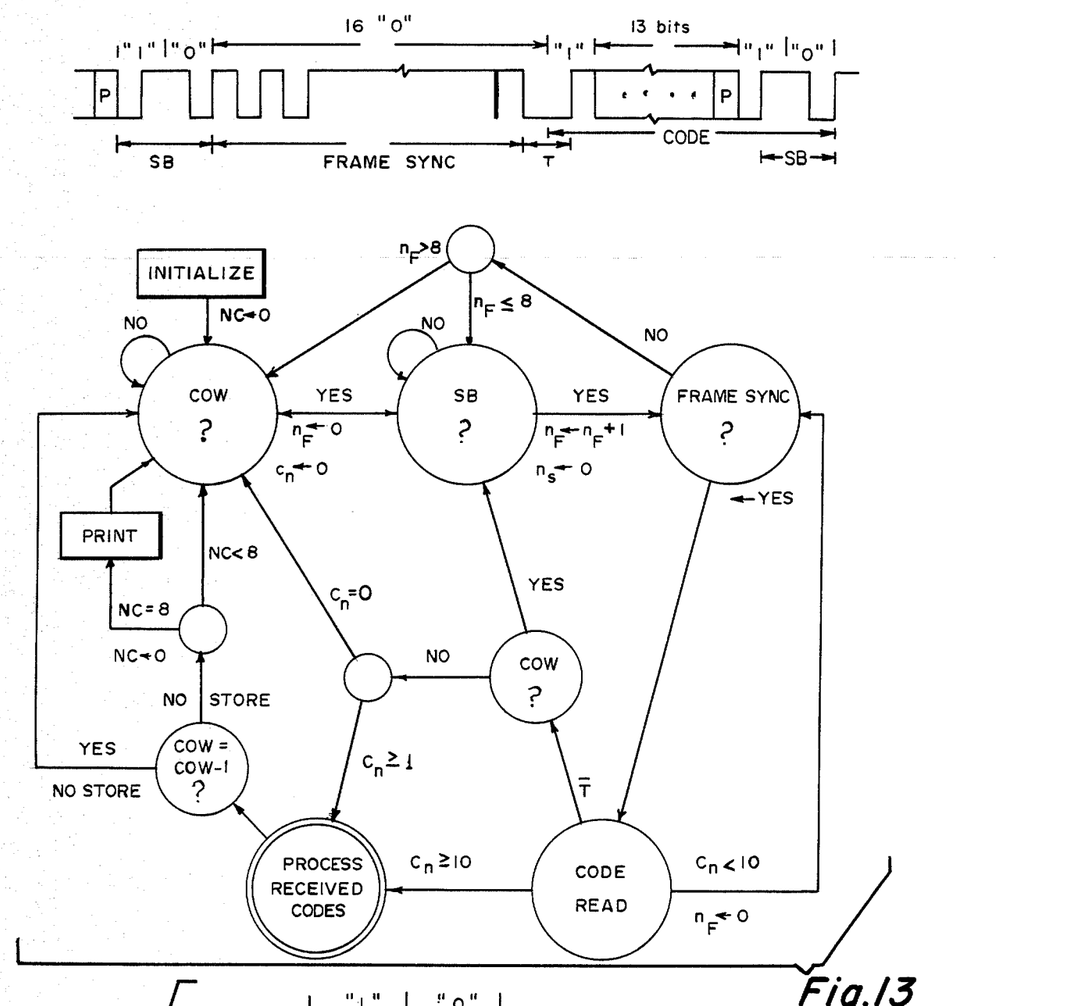
FIGS. 13–16 are flow diagrams illustrating the reading of the code identification signal in the receiver signal processor.
Figure 14:
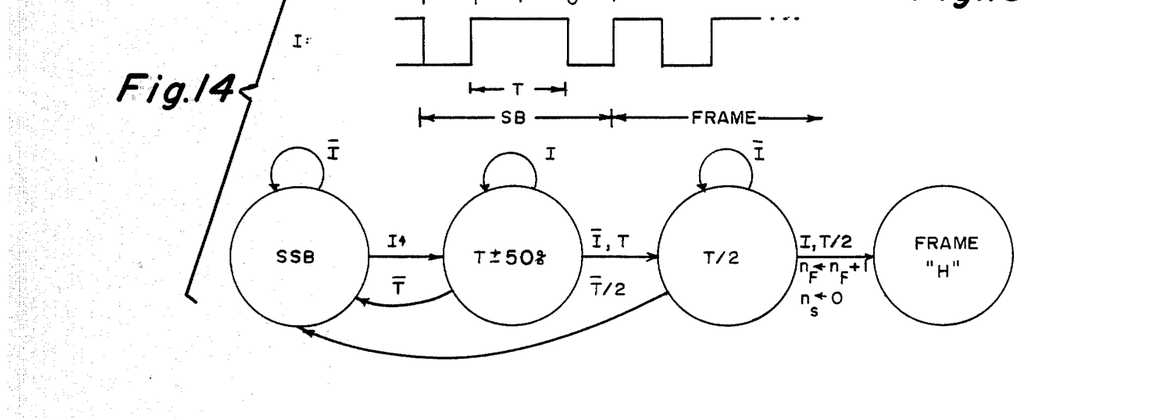
Figures 15, 16:
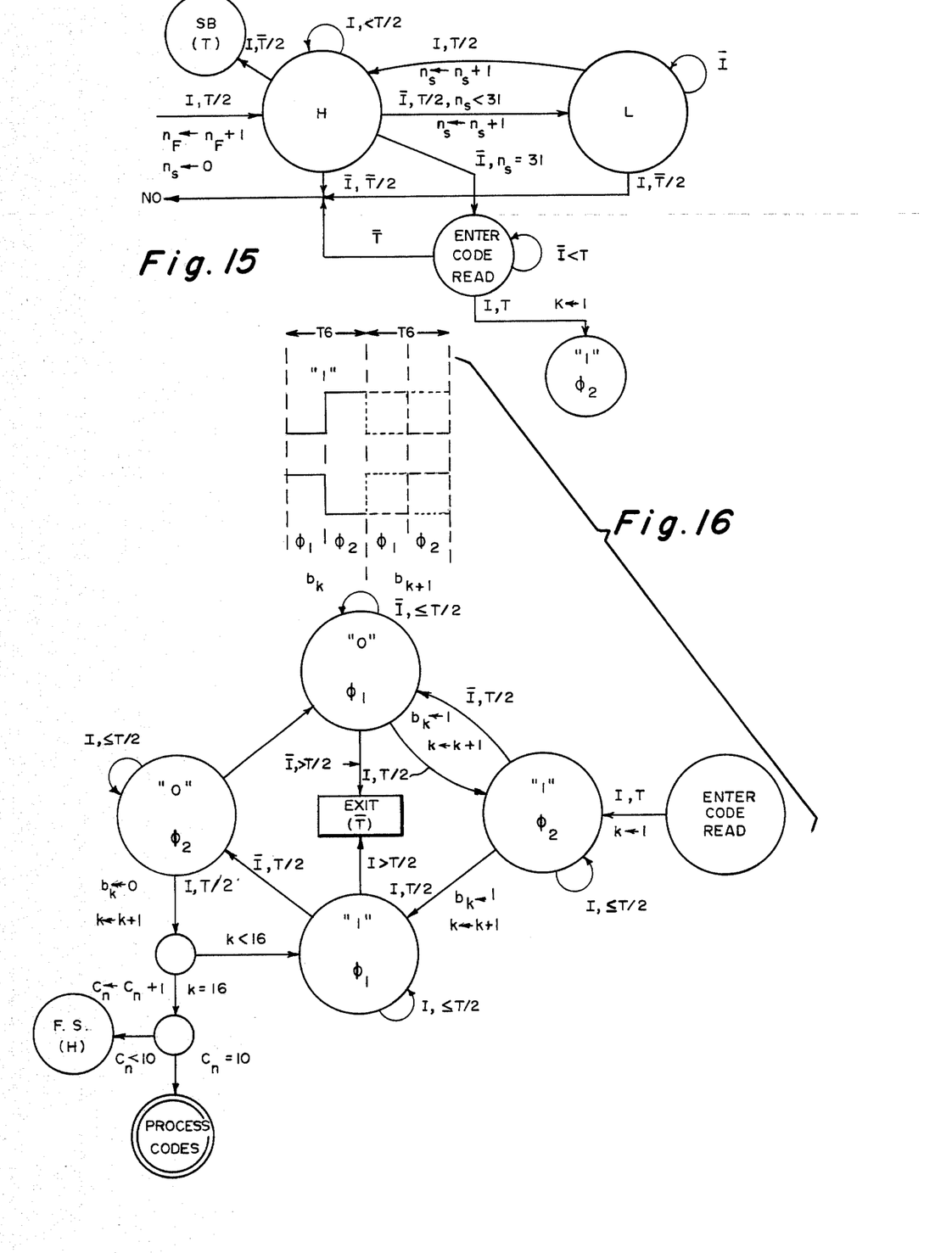

FIGS. 13-16 are flow charts illustrating data code processing within the signal processor 46 of the receiver. Specifically, FIG. 13 illustrates the transponder reader state, FIG. 14 illustrates a search for stop bits, FIG. 15 illustrates a frame SYNC, and FIG. 16 illustrates code reading. In FIGS. 13-16, $n_F$ represents the number of frame block efforts, $C_n$ represents the number of codewords reveived, T is the acceptable bit period where $\overline{T} \neq T$, $n_s$ is the SYNC bits counter and NC represents the number of cows in the group. In FIGS. 14, 15, and 16, I is the input train of data and K represents the bits counter (i.e. 1 ... 16).

The transponder of the present invention is simple in construction and of smaller size than prior art devices, whereby the transponder may be fabricated with integrated circuit techniques. From Eq. 2, it is possible to trade off reading range (r) with transponder size (A) without affecting the signal strength. Limiting the reading distance from 2.5 m (8.3 ft.) to 1.9 m (6.3 ft.), will allow for an equivalent transponder size reduction from 4.5 cm to 3.0 cm. Reading distances less than 2 m are not unreasonable in practice.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. A system for passively identifying remote objects, comprising
   (a) power transmitter means for transmitting a plurality of radio frequency burst signals at a given frequency;
   (b) passive transponder means associated with the object to be identified, said transponder means producing a plurality of uniquely coded identification signals at said given frequency in response to said burst signals;
   (c) receiver means for receiving said uniquely coded identification signals from said transponder means to identify the object; and
   (d) time division multiplexing means for alternately operating said transmitter and receiver means, whereby when the object is to be identified, said transmitter means transmits said burst signals for a limited period of time, thereby activating said transponder means to produce said uniquely coded identification signals, said time division multiplexing means operable to switch off said transmitter means following transmission and to switch on said receiver means to receive said uniquely coded identification signals from said transponder for identifying the object.

2. Apparatus as defined in claim 1, wherein said transponder means includes an inductor-capacitor antenna circuit which stores power from said burst pulses to generate said uniquely coded identification signals in response to said burst signals.

3. Apparatus as defined in claim 2, wherein said transponder means further includes code register means for storing an identification code corresponding to the object to be identified.

4. Apparatus as defined in claim 3, wherein said transponder means further includes modulator means for modulating said identification code to produce said uniquely coded identification signals.

5. Apparatus as defined in claim 2, wherein said transmitter means includes a tuned loop antenna which produces an intermittent oscillating field of said burst signals.

6. Apparatus as defined in claim 5, wherein said time division multiplexing means comprises a radio frequency duty control logic device.

7. Apparatus as defined in claim 6, wherein said transmitter means further includes a radio frequency power amplifier connecting one output from said radio frequency duty control logic device with said transmitter loop antenna for amplifying said burst signals.

8. Apparatus as defined in claim 2, wherein said receiver means includes a loop antenna for receiving said uniquely coded identification signals from said transponder means.

9. Apparatus as defined in claim 8, wherein said receiver means further includes signal processing means for processing said uniquely coded identification signals.

10. A passive transponder for identifying an object and receiving an input burst signal at a given frequency from an external source comprising:
antenna circuit means storing unregulated power from said received input burst signal, means receiving said unregulated power and producing clock pulses of variable period; storage means storing an identification code unique to the object to be identified; means for encoding said identification code; and a modulator receiving encoded identification data from said encoder and producing a modulated signal to said antenna circuit means, wherein said antenna circuit means utilizes said stored power to transmit a coded identification signal at said given frequency to an external location.

11. The passive transponder of claim 10 wherein said antenna circuit means comprises an inductor-capacitor circuit, said inductor receiving input burst signals and having a voltage induced across it to be stored in said capacitor for transmitting said coded identification signal.

12. The passive transponder of claim 10 wherein said storage means comprises a code register programmed and storing said unique identification code, said means for encoding receiving said identification code from said code register and shaping it into a twin binary signal.

13. The passive transponder of claim 12 wherein said means producing clock pulses produces clock pulses having a period that varies as a function of said unregulated power.

14. The passive transponder of claim 13 further comprising frame control means responsive to clock pulses for controlling the output of said code register in accordance with predetermined number of bits.

15. The passive transponder of claim 11 further comprising a source of clock pulses, said source of clock pulses actuated when said capacitor is charged to produce from said storage means said identification code at a given pulse rate.

* * * * *